United States Patent [19]
Swift et al.

[11] Patent Number: 5,719,941
[45] Date of Patent: Feb. 17, 1998

[54] METHOD FOR CHANGING PASSWORDS ON A REMOTE COMPUTER

[75] Inventors: Michael M. Swift; Clifford P. Van Dyke, both of Bellevue; Pradyumna Kumar Misra, Issaquah, all of Wash.

[73] Assignee: Microsoft Corporation, Redmond, Wash.

[21] Appl. No.: 587,886

[22] Filed: Jan. 12, 1996

[51] Int. Cl.⁶ .............................. H04L 9/32; H04L 9/00
[52] U.S. Cl. ..................... 380/25; 380/4; 380/9; 380/21; 380/23; 380/49; 380/50; 340/825.31; 340/825.34; 395/188.01; 395/491
[58] Field of Search .................... 380/4, 9, 23, 25, 380/28, 29, 49, 50, 21, 44, 46; 340/825.31, 825.34; 395/188.01, 491

[56] References Cited

U.S. PATENT DOCUMENTS

| | | | |
|---|---|---|---|
| 4,786,900 | 11/1988 | Karasawa et al. | 340/825.31 |
| 5,287,519 | 2/1994 | Dayan et al. | 380/23 X |
| 5,475,762 | 12/1995 | Morisawa et al. | 380/25 |

OTHER PUBLICATIONS

Microsoft Corporation, Microsoft LAN Manager Programmer's Reference: Network API Functions for OS/2, Windows, and DOS, pp. 604–660 (1990).

*Primary Examiner*—Bernarr E. Gregory
*Attorney, Agent, or Firm*—Leydig, Voit & Mayer, Ltd.

[57] ABSTRACT

A method for changing an account password stored at a physically remote location is provided. After initiating a password change sequence, a user submits both an old and a new password to its client machine. Thereafter, the client computes two message values to be transmitted to the server. The first message is computed by encrypting at least the new password using a one-way hash of the old password as an encryption key. The second message is computed by encrypting the one-way hash of the old password using a one-way hash of the new clear text password as the encryption key. The server receives both messages and computes a first decrypted value by decrypting the first message using the one-way hash of the old password, previously stored at the server, as the decryption key. The server computes a second decrypted value by decrypting the second message using a one-way hash of the first decrypted value as the decryption key. The server compares the decrypted one-way hashed value, transmitted in encrypted form in the second message, to the pre-stored hashed old password. If the two values are equal, then the server replaces the old password by the new password.

18 Claims, 5 Drawing Sheets

METHOD FOR CHANGING PASSWORDS ON A REMOTE COMPUTER

AREA OF THE INVENTION

The present invention generally relates to secure computer network environments, and more particularly to a method for securely changing a password in a network computing environment.

BACKGROUND OF THE INVENTION

Personal computers, or workstations, may be linked through a computer network to allow the sharing of data, applications, files, processing power, and other resources such as printers, modems, and mass storage devices. Multiple computer networks, in turn, may be adapted for intercommunication for many of the same purposes. These devices may be communicatively joined via known local area network links, or alternatively via known wide area network links.

As is known, one of the primary jobs of a server for network resources is to provide controlled access by accounts (for example users or services) to the network resources with which the server is associated. Accordingly, a server manages the resources and data for which it is responsible and facilitates access to the resources and data by networked machines logged on to the network by means of credentials for authorized users and services. These networked machines are often referred as "clients" or "workstations."

It is known for one or more network servers to be responsible for administering and limiting network access to clients for which valid account credentials (representing for example, users or services) have been provided during a network logon procedure. To this end, the network server maintains a security database including account identifications corresponding to users and services authorized to access (via a client from which a logon request originated) the network and the protected network resources for which the network server enforces limited access.

In order to prevent unauthorized users or services from accessing networks or the resources therein, network servers typically maintain, within their security databases, information for authenticating accounts during logon. This information is typically a password (in original or modified form) for each account having authorized access to the network. Therefore, in order for a user to logon to the network via a client, the user must submit identification and authentication information, by means of the client, to the network server. This information includes an account name (or other identification) in addition to a valid password corresponding to the user's account.

In known networks, the above described logon/account authentication procedure is the only form of account authentication provided, and the various servers managing network resources, such as printers and data storage devices do not require any further submission of authentication information in order to determine whether to grant access. That is, once an account has logged onto the network via a linked client, requests from the linked client for access to resources such as printers data storage do not require submission by the client of further identification and authentication information.

However, in other networks having restricted resources administered by multiple independent security servers, the independent security servers may require submission by a client of further, independent account identification and authentication information before granting access by the client to additional network resources protected by the network servers. In such networks, the client may be required to further logon with valid account identification and password information for each one of the accessed multiple independent resource servers in the network.

By way of a simple illustration, consider a network having at least two accounts, account A and account B. A file server may partition and allocate certain resources for access only by account A and certain other files for access only by account B. Although account A may be logged onto the network server, it may also be required to separately logon to the file server in order to gain access to the password-protected files. Account A may have similar or different passwords among the various servers on the network. It is noted that while the above example of multiple logons for a single account concerned servers on a same network, the requirement for an account to perform multiple logons is also encountered when a user or service attempts to connect to other networks or sub-networks via a single client.

Various distinct one-way hash functions are currently applied to passwords in order to protect the secrecy of the passwords when they are transmitted on non-secured links in a network. Hash functions take an input string (in this case a password) and convert the input string into an output string. One-way hash functions are relatively easy to apply to an input string; however, it is virtually (or practically) impossible to reverse the one-way hash function in order to obtain the input string from the one-way hash function's output string. These routines are well-suited for applications in which the receiving party does not need to know the input string corresponding to an output string in a received message. Such a case arises when a server authenticates a user during logon.

During logon, a client may transmit a (possibly encrypted) one-way hash, rather than the clear text form, of a user's password to a server. The server need not know the specific client password because the one-way hash of the password is compared to a one-way hash of the password already stored at the server when the account was initially created on the server or the user executed a change password routine.

When a user changes an account password, it is customary for a client to transmit both the old password and the new password for the user's account. The old password enables the server to verify that the user has authority to change the password. Because passwords are an essential element for access by accounts to restricted network resources, the possibility that a network "snoop" is monitoring a network link poses a security risk when a user replaces an old password by a new password at another (e.g., server) node in a network. A snoop may reside on another client and be monitoring data transmissions on a network link. If such a snoop detects a password transmission—either clear text or in hashed form -, the snoop may then use the password to access otherwise password-protected information on one or more servers for which the password was used to gain access to associated restricted resources.

Encryption schemes have been incorporated into password change protocols so that the process of a user changing a password stored at a remote computer, such as a server, is virtually immune from acquisition by a network snoop. Under such schemes, the sender and receiver of the encrypted password change messages respectively know the operative encryption and decryption functions. The sender encrypts the messages by applying an encryption function and key to the messages. The receiver decrypts the messages using a corresponding decryption function and corresponding key known by the receiver.

Encrypting passwords certainly adds a layer of security to the network. However, hackers have been known to intercept encrypted password change messages and manage to decrypt the messages and defeat the enhanced security measures.

Applying one-way hash functions to passwords prior to encryption and transmission (as described above) provides a desirable alternative to transmitting clear text passwords over non-secure lines to a server. However, one-way functions are irreversible. Therefore, while hashed passwords may be obtained by the receiver applying a proper decryption key and function, the receiver cannot retrieve the clear text password from the hashed one-way function of the clear text password submitted by a client and perform operations based upon a clear text password rather than a hashed password.

SUMMARY OF THE INVENTION

Accordingly, it is a general object of the present invention to provide an improved method for changing account passwords in a network environment.

Another object of the present invention is to provide a secured method for changing account passwords in a network environment, whereby a server is able to obtain, from a "password change" message, a new password in clear text form and ensure that the source of the new password is authorized to change the password.

Additional objects, advantages and other novel features of the invention will be set forth in the detailed description that follows with reference to the accompanying drawings and will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a method for replacing, in a server's account database, an old account password by a new account password in a network. In accordance with the present invention, a user or service establishes a connection to the server via a client. The client then computes a first message (M1) by encrypting at least a new clear text password using a one-way hash of the old password as the encryption key. A second message (M2) is computed by the client by encrypting at least the one-way hash of the old password with a one-way hash of the new password (as the encryption key). The client transmits both the first message and the second message to the server.

After receiving the first message, the server computes a decrypted first message (D1), including at least the new clear text password, by decrypting the received first message (M1) using a copy of the one-way hash of the old password, previously stored by the server, as the decryption key. The new clear text password is thereafter obtained from the decrypted first message.

The server computes a decrypted second message (D2), including at least the one-way hash of the old password, by decrypting the received second message (M2) using a one-way hash of the new clear text password (generated by the server after obtaining the clear text password from the decrypted first message) as the decryption key. The one-way hash of the old password, used to authenticate the source (e.g., user) of the password change, is thereafter obtained from the decrypted second message.

Finally, the server authenticates the changed password by verifying that the one-way hash of the old password retrieved from the decrypted second message (D2) matches the one-way hash of the old password stored at the server before the first message (M1) and second message (M2) were received by the server when the user commenced the process of changing passwords. The server may keep the old password and hash it during the change password process, or the server can merely hash and then save only the one-way hash of the old password.

In accordance with a particular embodiment of the invention, the new clear text password and the one-way hash of the old password which are used, respectively, to compute the first message and the second message respectively, make up only a portion of their messages. The remainder of each of these messages includes a sequence of random filler data and another portion identifying the length of the new clear text password or the one-way hash of the old password (depending upon the message type).

As referred to below, a "security provider" (or simply "provider") is a network entity that maintains a table of accounts and associated passwords. A security provider may be a server. Alternatively, a security provider having a more limited function may simply notify one or more other servers that manage their respective tables of accounts of changes to network security information (e.g., changes to account passwords). Yet another example of a provider is a server (e.g. a WINDOWS NT server) that maintains, in addition to its own set of passwords for an account, additional hashed passwords corresponding to a NETWARE format for storing passwords on a server. A potential use arising from storing the NETWARE format of the passwords in addition to the WINDOWS NT format is the enabling of a NETWARE client to connect to an NT server.

In accordance with a particular embodiment of the present invention, a method for synchronizing a changed account password at a first server with one or more other providers is described. In accordance with this aspect of the invention, synchronization is achieved by the server notifying other providers of a password change for a particular user or service. Associated with each synchronizing provider is a corresponding subroutine to inform the synchronizing provider of the new password for the account. The server provides the clear text of the password to the subroutines for communicating with the determined providers in a manner such that security is ensured. Since the subroutines reside on the same physical node as the server, a security breach is not likely to occur during the passing of a clear text password to the subroutines for the determined providers. The subroutines apply their own, system specific, hash and encryption procedures before transmitting notification messages to the determined providers.

The above described invention provides significant advantages over known password modification schemes. For example, as a result of the ability of the server to obtain a clear text password during a password change for an account, password selection rules may be imposed (e.g., a mixture of numbers and alphabetical characters, a combination of upper and lower-case alphabetical characters, or no password can be found in a dictionary) at the server in a centralized manner rather than at the clients. As a further consequence it is very easy (from a user's and/or network administrator's point of view) to update, maintain and uniformly enforce password selection rules upon changed passwords.

Furthermore, when a user relies upon several independent providers having independently established passwords, and the user utilizes the same password for each independent provider, (as explained above) the ability of the server to obtain a clear text password enables the server to synchronize (i.e., propagate) the password change across all of the independent providers that use the same password. As will be explained below, this is accomplished by the server calling provider-specific subroutines residing on the server's node which in turn communicate the password change to their respective affected providers.

BRIEF DESCRIPTION OF THE DRAWINGS

The accompanying drawings incorporated in and forming a part of the specification, illustrate several aspects of the present invention, and together with the description serve to explain the principals of the invention. In the drawings.

DETAILED DESCRIPTION OF THE PREFERRED EMBODIMENT

Figure 1:
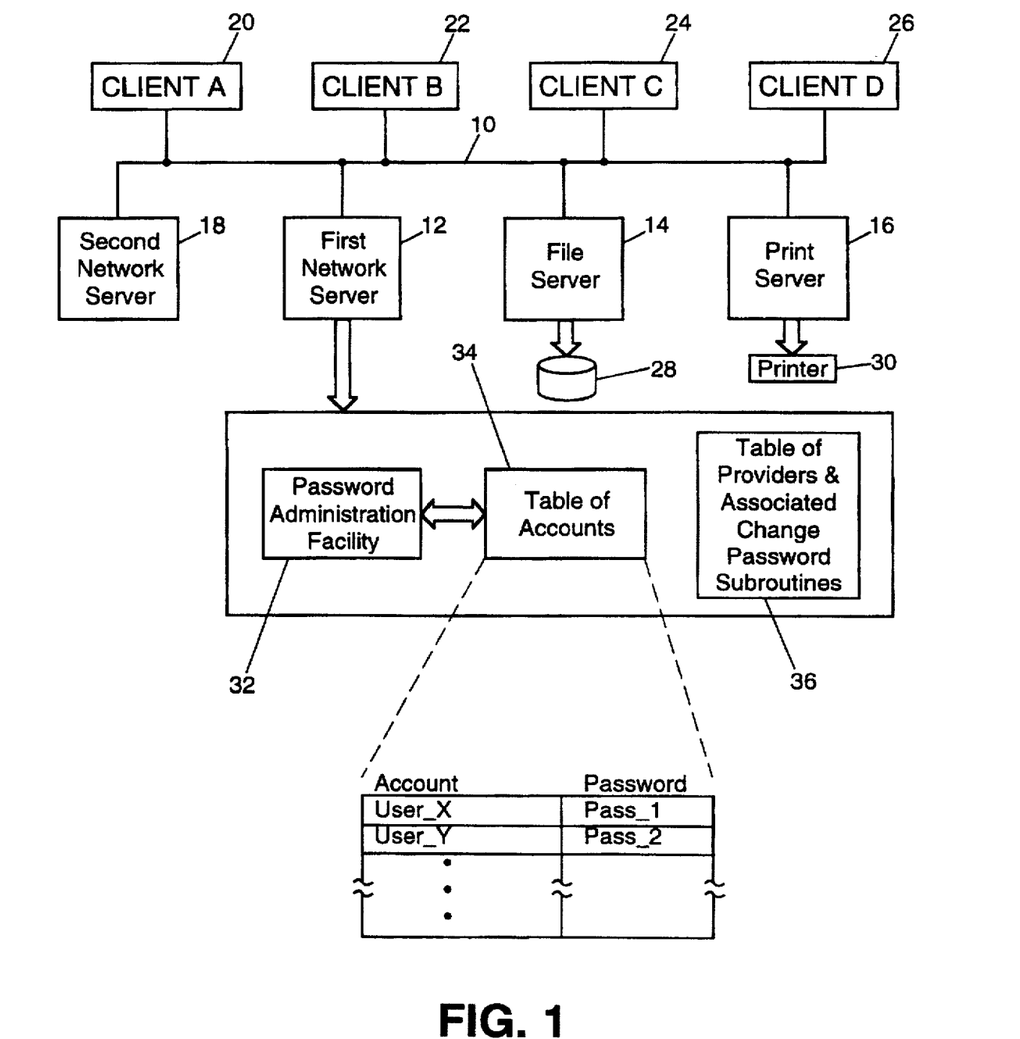
FIG. 1 is a diagram illustratively depicting a network environment suitable for implementing a password modification scheme in accordance with the present invention.

Turning now to the drawings, FIG. 1 illustratively depicts an exemplary computer network for incorporating the present invention. A network link 10 communicatively couples a number of nodes including client nodes and server nodes. In the illustrated embodiment, the network link comprises for example an Ethernet link. However, other network links will be appreciated by those skilled in the art. As further illustrated in FIG. 1, the exemplary network also comprises several servers including a first network server 12 (running a first network operating system), a file server 14, a print server 16, and a second network server 18 (running a second, distinct network operating system). Client A 20, client B 22, client C 24 and client D 26 communicate via the network link 10 with other nodes within the network illustrated in FIG. 1. Generally, the messages and transactions that occur across the network are controlled or administered by the first network server 12 and second network server 18. In this regard, the clients 20, 22, 24 and 26 communicate directly via the network link 10 or indirectly through network facilities such as email which are administered by server such as the first network server 12.

FIG. 1 also includes network resources such as a hard drive 28 and printer 30. In this particular example, client access to the network resources is facilitated by the first network server 12 and the second network server 18 in combination with the servers for the actual resources (e.g., file server 14 and print server 16). Access to the network is generally governed by the either the first network server 12 or the second network server 18 (depending upon the specified network operating system). Once a client is allowed access to a network via a logged on account, the file server 14 enforces the prescribed access rights for the logged on account to data stored on the hard drive 28.

Although particular configurations may differ widely from network to network, typically the network administrator will configure the first network server 12 with a list of user accounts names and associated account information. In order for a client to access the network, a user or service having an account on the first network server initiates a logon procedure with the first network server 12. As a part of the logon procedure, and for purposes of network security, the client must provide an account name and authentication information (e.g., a password) in order to gain access to the network resources for which the first network server 12 is responsible. On verification of the proper password, the first network server 12 executes logon routines identifying the client's logged on account to network resources within the first network server 12's responsibility.

As mentioned above, the second network server 18 operates (or is emulating) a network operating system that is different from the network operating system running on the first network server 12. In another embodiment (not illustrated), the second network server 18 may in fact reside on physically distinct network. However, accounts on a local network (such as the one illustrated in FIG. 1) may access the physically distinct network and the resources provided therein by means of the second network server 18 or other suitable security provider. In such a case, a dial-up or other known network link provides access to the physically distinct network. The dial-up and connection from the local network to the remote network is performed, for example, by the first network server 12.

Having described illustrative environments wherein the present invention is favorably incorporated, attention is now be directed to a description of certain portions of the first network server 12 for carrying out the present invention. In order to gain access to network services and resources, a user or service logs onto the network by submitting a name and password to the first network server 12 by means of the client A 20. The first network server 12 verifies the authenticity of the identified account and password by means of a password administration facility 32 and table of accounts 34. While reference will be made to the first network server 12 performing steps for carrying out the present invention, these functions are primarily executed, in particular, by the routines performed by the password administration facility 32. In accordance with a preferred embodiment of the present invention, the first network server 12 also includes a table of providers 36. As previously defined a provider is a network entity that maintains a table of accounts and associated passwords. A security provider may be a server. Alternatively, a security provider having a more limited function may simply notify one or more other servers that manage their respective tables of accounts of changes to network security information (e.g., changes to account passwords). Yet another example of a provider is a server (e.g. a WINDOWS NT server) that maintains, in addition to its own set of passwords for account, additional hashed passwords corresponding to a NETWARE format for storing passwords on a server.

In the preferred embodiment, the table of accounts 34 includes a list of user accounts and corresponding passwords (as well as associated account-specific security information). For purposes of illustration, the table of accounts 34 has been set up in row and column form. In the illustrated table, the first column comprises the account name, and the second column comprises password information. In the interest of brevity and in view of the knowledge of those skilled in the relevant art, other account information well known to those skilled in the art has not been included in this description since the present invention concerns registering a new password on a server and synchronizing the password across a number of independent providers.

The table of accounts 34 is organized to associate account names to their current stored password (clear text or one-way hashed form). For example, in the system illustrated in FIG. 1, User_X is assigned a password "Pass_1." User_Y is identified by password "Pass_2." These passwords are stored in either clear text or hashed form.

It is understood that in some instances resource servers, such as the file server 14 and print server 16, permit open access to any account logged into the first network server 12, and therefore a user or service need not separately logon to these servers after logging onto a network server with which the resource servers are associated. Instead, when a user or service, logged onto the first network server 12, attempts to access the resource servers, such resource servers verify the account privileges resulting from the user or service logging onto the first network server 12. In such an instance, there is not a separate entry in the Table of Providers 36 identifying the resource server.

In other instances, independent resource servers may exist. As a result, a user or service must independently log onto the resource server in order to access associated resources. In such an instance, in accordance with a preferred embodiment of the invention, the Table of Providers 36 includes an entry for the independent resource server and an identified subroutine for notifying the resource server of any password change for an account.

Figure 2:
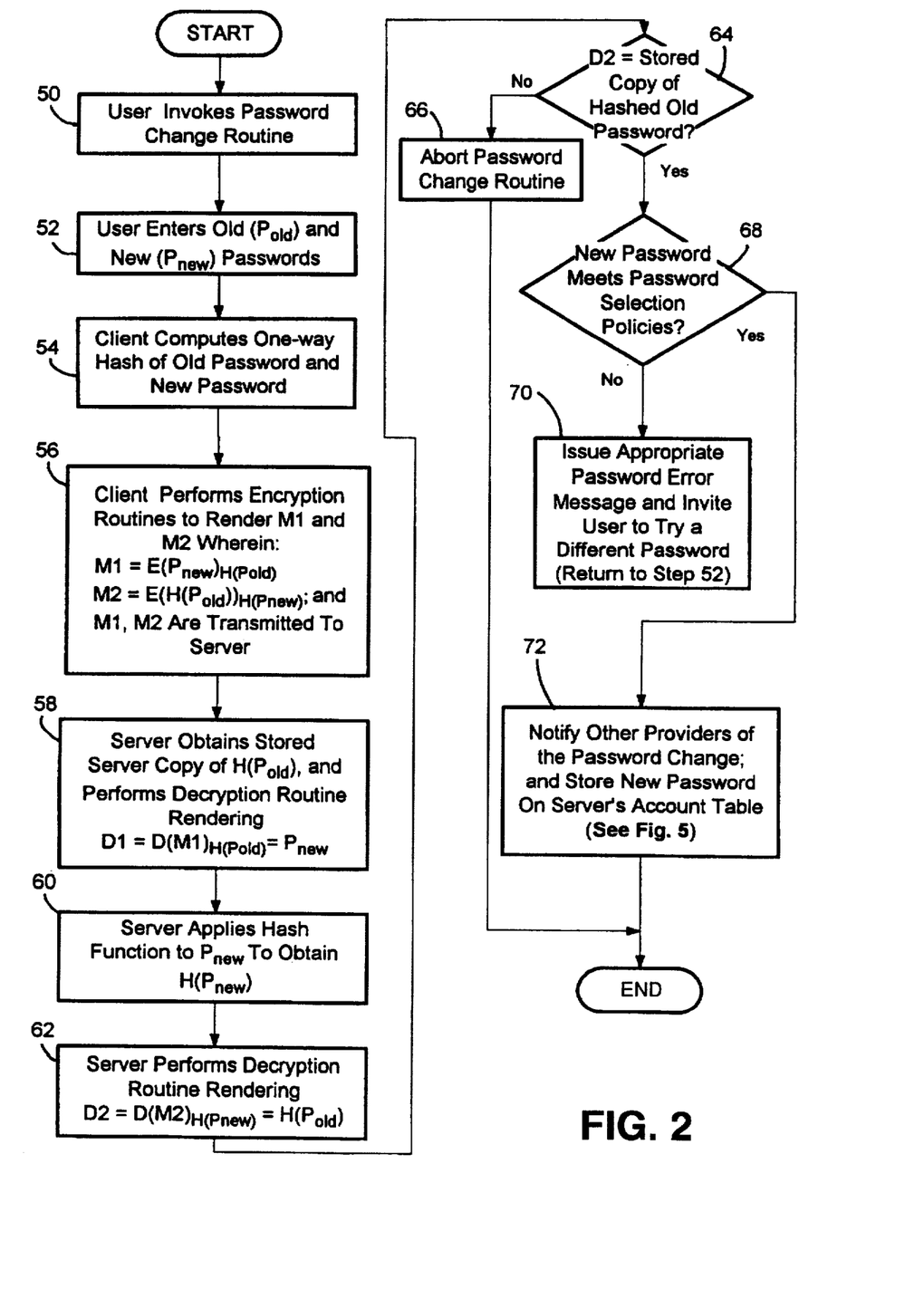
FIG. 2 is a flowchart summarizing the principal steps for replacing an old password by a new password for an account on a server in accordance with the present invention.

Having described an exemplary network for practicing the present invention, reference is now made to FIG. 2 wherein the primary steps for changing a password stored at a remote computer (server 12) are summarized. The password change operation commences at step 50 when, for example, User_X at the client A 20, submits a request to change its password "Pass_1." User_X is prompted via the client A 20 and enters both the old password ("Pass_1") and a new password ("Secret_1") in clear text form during step 52.

Next, at step 54, the client A 20 computes a one-way hash of both the old and new passwords. While no particular one-way function is required, in an embodiment of the present invention the known MD4 one-way hash function is applied to the old password and the new password by the client A 20. Alternatively, the MD5 one-way hash function is applied to the passwords. While there is no specific requirement for a particular one-way hash function, the same one-way hash function must be applied by both the client A 20 and the first network server 12 in order to ensure proper verification of results obtained by the server 12 after decrypting a set of password messages (explained below). A password change routine could apply distinct one-way hash functions to the old password and new password, and valid results could be obtained by applying the same set of distinct hash functions on the server side to the unencrypted old and new passwords.

Next, during step 56, the client A 20 formulates two individual messages, M1 and M2 by applying a reversible encryption function, such as DES or RC4 which are both well-known encryption schemes. Similar to the hash functions, M1 and M2 may be encrypted by means of different encryption schemes as long as a corresponding decryption scheme is used by the server 12 to decrypt the received messages.

Where:

$P_{old}$=Old Clear Text Password, $P_{new}$=New Clear Text Password, $H(X)$=One-way Hash of X, $E(M)_K$=Encryption of message M using Key K, $D(M)_K$=Decryption of message M using Key K, and $D(E(M)_K)_K$=M (i.e., decrypting an encrypted message with a same key produces the original message)

The first message, M1, is formulated by encrypting the new clear text password with the one-way hash of the old clear text password as the encryption key. In equation form:

$$M1=E(P_{new})_{H(Pold)}.$$

The second message, M2, is formulated by encrypting the one-way hash of the old password with the one-way hash of the new password as the encryption key. In equation form:

$$M2=E(H(P_{old}))_{H(new)}.$$

After formulating the messages M1 and M2, the client A 20 transmits the messages M1 and M2 via the network link 10 to the first network server 12. In addition to the messages M1 and M2, the client A 20 transmits User_X's name or other suitable account identification enabling the server to determine the identity of the account for which a password change is requested. It will be appreciated by those skilled in the art that the messages M1 and M2 are independent values and need not be generated or transmitted to the first network server 12 in any particular order.

Prior to receiving the M1 or M2 messages, the first network server 12 has a form of the User_X's old password stored in the table of accounts 34. The form of the old password may be either a one-way hash of the old password, or a clear text form of the old password from which the first network server 12 can readily generate a one-way hash of the old password.

During step 58, after obtaining a hashed version of the User_X's old clear text password previously stored on the first network server 12, the first network server 12 decrypts M1 using the hash of the old clear text password as a decryption key in order to reverse the operation performed during step 56 that rendered M1. In equation form:

$$D1=D(M1)_{H(Pold)}.$$

The resulting decrypted first message (D1) equals the new clear text password ($P_{new}$).

Next, at step 60, the first network server 12 applies a one-way hash function to D1 ($P_{new}$) to obtain a hashed new password H($P_{new}$). The hash function applied during step 60 is the same as the hash function applied to the new clear text password during step 54. At step 62, the first network server 12 then decrypts M2 using the hashed new password as a decryption key in order to reverse the operation performed during step 56 that rendered M2. In equation form:

$$D2=D(M2)_{H(P_{new})}.$$

Assuming the User_X provided the correct values for the old and new clear text passwords (during step 52), the resulting decrypted second message (D2) equals the hashed old password H($P_{old}$) calculated, or otherwise obtained, from the password for User_X stored in the table of accounts 34.

Next, at step 64, the first network server 12 compares the value D2 to the hashed old password value obtained from the table of accounts 34. If during step 64 the first network server 12 determines that the two values are not the same, then control passes to step 66 wherein the first network server 12 aborts the password change operation in a known manner, and control then passes to the End of the change password procedure. It is also noted that a number of re-tries may be allowed by the change password routine. In such a case, control would return to step 52 unless the user has utilized all of its allotted repeat attempts to change a password and control passes to the End.

However, if at step 64 the two values are equal, then the authentication of the User_X is considered successful (i.e., the proper old password was entered during step 52), and control passes to step 68. At step 68, the first network server 12 executes one or more routines implementing password selection policies intended to prevent (or alternatively discourage) users from selecting certain character strings. One common policy concerns discouraging the use of common character strings (i.e., dictionary words) since one of the most prevalent type of password stealing strategies involves the use of dictionary words for passwords. Another common password policy enforces minimum character string length. Other password policies will be known to those skilled in the art.

If during step 68, the first network server 12 determines that the new password submitted by the User_X during step 52 is not an acceptable password, then control passes to step 70. At step 70, the first network server 12 returns an error message to the client A 20 and the User_X is informed of the password selection policy and prompted to re-enter the old password and another new password (in accordance with step 52 described above), and the password change process continues as shown in the remaining steps of FIG. 2.

However, if at step 68, the first network server 12 determines that "Secret_1", the new password submitted by User_X to the first network server 12 meets the password selection policies, then control passes to step 72. At step 72, the first network server 12 notifies other providers identified in the table of providers 36 of the account password change so that the other providers may update their respective password entries for the User_X account. The first network server 12 also stores a form of the new password in the User_X account entry in the table of accounts 34 and returns a message to the client A 20 indicating that the new password was accepted. Control then passes to the End of the clear text password change procedure.

Figure 3:
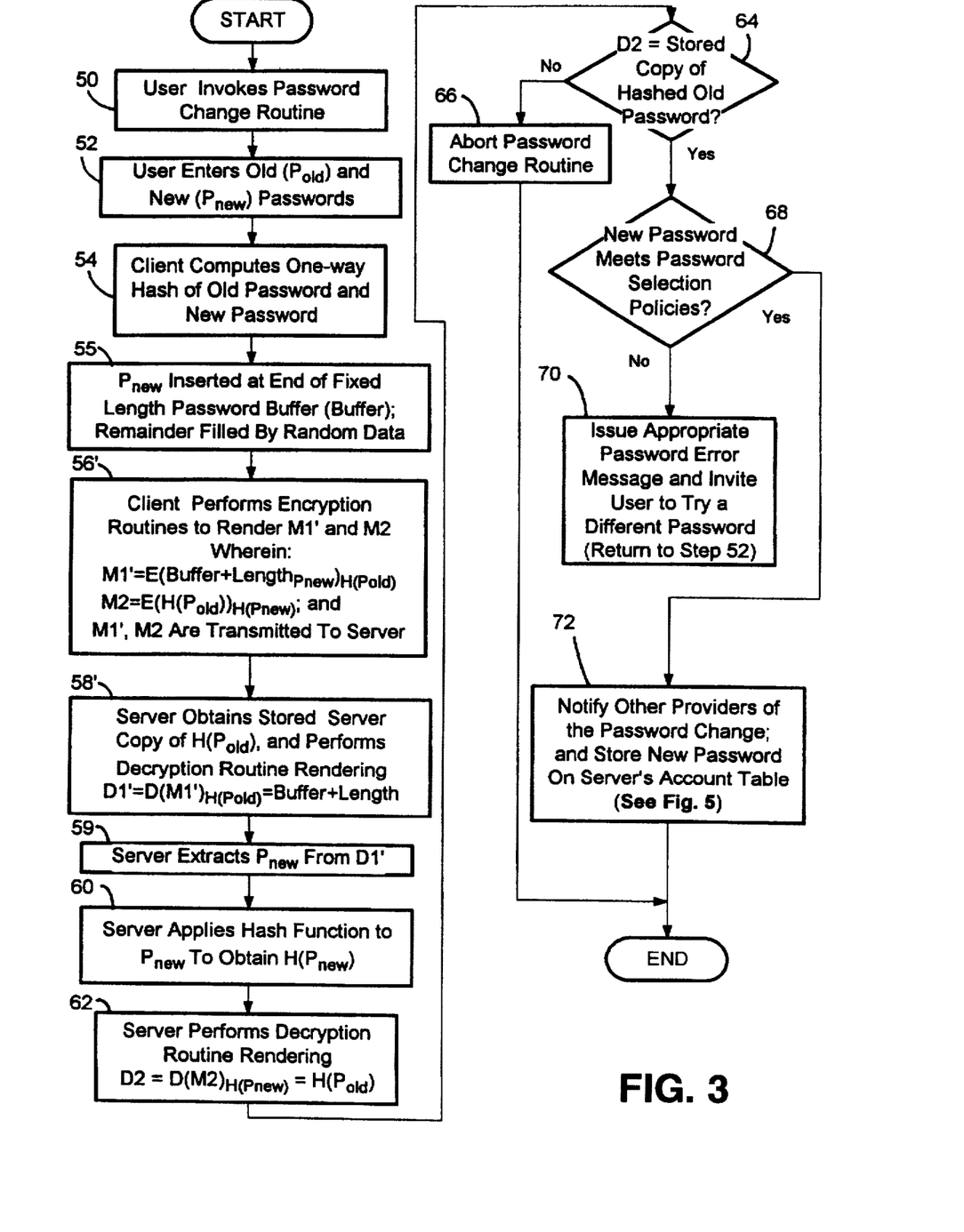
FIG. 3 is a flowchart summarizing the principal steps for replacing an old password by a new password in accordance with the present invention and wherein a new clear text password and a one-way hashed old password are placed within a message containing random filler data to further frustrate attempts by others to obtain an account's password.

In another embodiment of the present invention illustrated in FIG. 3, modifications are incorporated into the process summarized in FIG. 2 in order to prevent network snoops from stealing passwords by intercepting and then decrypting the password change transmissions from clients to the servers maintaining account passwords. The modifications to the method illustrated in FIG. 2 are found in the steps 55, 56', 58', and 59. The new numbers represent added steps while the prime notation after a previously used step number (from FIG. 2) indicates that the step is substantially the same, but has been modified in order to accommodate the new password format. The remaining steps are the same as the steps labelled identically in FIG. 2.

As an introduction to the modified steps in FIG. 3, sending a clear text password, even in encrypted form as in FIG. 2, faces the threat of capture and subsequent decryption by sophisticated network eavesdropping devices (snoops). Identifying the beginning of an encrypted message is a very valuable piece of information for a snoop and represents a very large step toward decrypting a message. Knowing the length of the password is also a very valuable piece of information to a snoop. Therefore, as a further measure of protection from snoops, the clear text password is preceded in a fixed length password buffer by a string of random data bytes. A length field is appended to the tail of the fixed length password buffer and indicates the length of the password located at the end of the password buffer. The string of data containing the password buffer and length field is then encrypted using any reversible encryption scheme and the one-way hashed old password (as the encryption key) in order to obtain a first encrypted buffered message M1'. The presence of a variable length string of random data before the beginning of the encrypted clear text password makes identification of the beginning point of clear text data significantly more difficult for a network eavesdropper. As a result, stealing of clear text passwords during a password change procedure incorporating the steps summarized in FIG. 3 is considerably more difficult than merely encrypted clear text passwords (as in FIG. 2).

Figure 4:
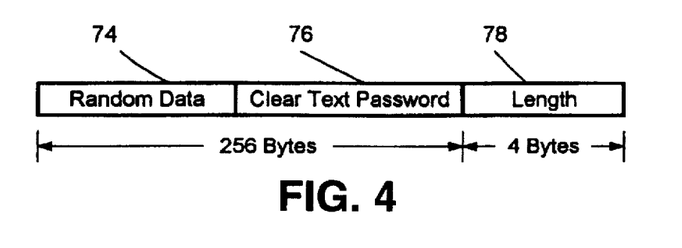
FIG. 4 is a diagram illustrating the structure of a message packet containing an encrypted password in accordance with the method summarized in FIG. 3.

Turning to FIG. 4 a 260-byte password message is depicted having a random data portion 74, a clear text password portion 76, and a password length section 78 appended to the end of the clear text password portion 76 of the 260-byte password message. The password is stored at the end of a fixed length, 256-byte password buffer (comprising the random data portion 74 and the clear text password portion 76), and the remaining (leading) portion is filled with random data. Thus, the password buffer accommodates a variable length password consisting of as many as 256 characters. The password length is stored in the remaining four bytes of the 260-byte password message.

It is noted that the byte-lengths of the password message components are illustrative and are by no means intended to limit the scope of the present invention for may different byte lengths are contemplated in accordance with the present invention. In fact, the present invention is very flexible and thus amenable to a wide variety of variations in terms of the data structures, notification mechanisms, and encryption schemes utilized in password maintenance facilities incorporating the present invention.

Because the majority of the steps in the method for changing a password summarized in FIG. 3 are the same as the steps summarized in FIG. 2, attention is directed only to the steps which have been modified in order to accommodate the use of the 260-byte password message, illustratively depicted in FIG. 4. Therefore, referring to step 55 in FIG. 3, the first modified step in accordance with the alternative password buffer format, after the client has computed one-way hashes of the new password and the old password, a password message formulation routine inserts the new clear text password at the end of the 256-byte password buffer.

However, the use of a clear text password is not an absolute requirement. In yet another alternative embodiment of the present invention, the clear text password is encrypted by means of a reversible encryption function prior to insertion into the password buffer. In such a case, a decryption function and key must be applied by the network server performing the password change in order to obtain the clear text password.

Also during step 55, the client determines the length of the password and inserts that value into the 4-byte Length field 78 of the non-encrypted password message. The client also inserts a string of random characters in the portion 74 of the 256-byte password buffer that is not occupied by the new clear text password (portion 76).

Next, at step 56' the client performs encryption routines and then transmits the encrypted messages M1' and M2 in substantially the same manner as step 56 previously described above with respect to FIG. 2. However, rather than encrypt only the new clear text password ("$P_{new}$"), during step 56' the encryption routine encrypts the entire 260-byte password message (See FIG. 4) including both the password buffer ("Buffer") and the new clear text password length data ("$Length_{P_{new}}$").

It is noted that while one may buffer the hashed old password for purposes of creating a similar encrypted message packet M2', such encryption is not as important in view of the hashed state of the password and the fact that this value will become obsolete when the new password replaces the old password. Therefore, M2 does not include encrypted random data or length data.

Thereafter, at step 58', the first network server 12 receives the encrypted 260-byte password message (M1'). The first network server 12 decrypts M1' using the one-way hash of the old password as a decryption key, thus obtaining the original 260-byte password buffered message.

Next, at step 59, the first network server 12 extracts the new clear text password from the 260-byte password message. The first network server reads the length field at the end of the password message. Based upon the length field data, the first network server 12 extracts the new clear text password from the 256-byte password buffer. Control then passes to the previously described step 60 and the remaining steps identically numbered to corresponding steps in FIG. 2. Since the remaining steps have been described in conjunction with FIG. 2, their description will not be repeated here.

In accordance with another aspect of the present invention, by transmitting the password to the first network server 12 in a form that may be decrypted by the first network server 12 into the clear text form, synchronization of the password change among other providers may be achieved by calling appropriate password change subroutines associated with the various other providers listed in the table of providers 36 (during step 72). Assuming that appropriate subroutines are available, a user need not perform this synchronization function manually. That is, when a single client has multiple password-protected accounts (e.g., multiple server or provider accounts) on a network or internetwork, a user may desire password uniformity for all of the user's accounts on other providers in the network or internetwork.

Therefore, in accordance with yet another particular aspect of an embodiment of the present invention, when a user or service completes a password change on the first network server 12, a mechanism is provided for synchronizing an account password change with all other internetwork providers for which the named account maintains an identical password.

Figures 5, 6:
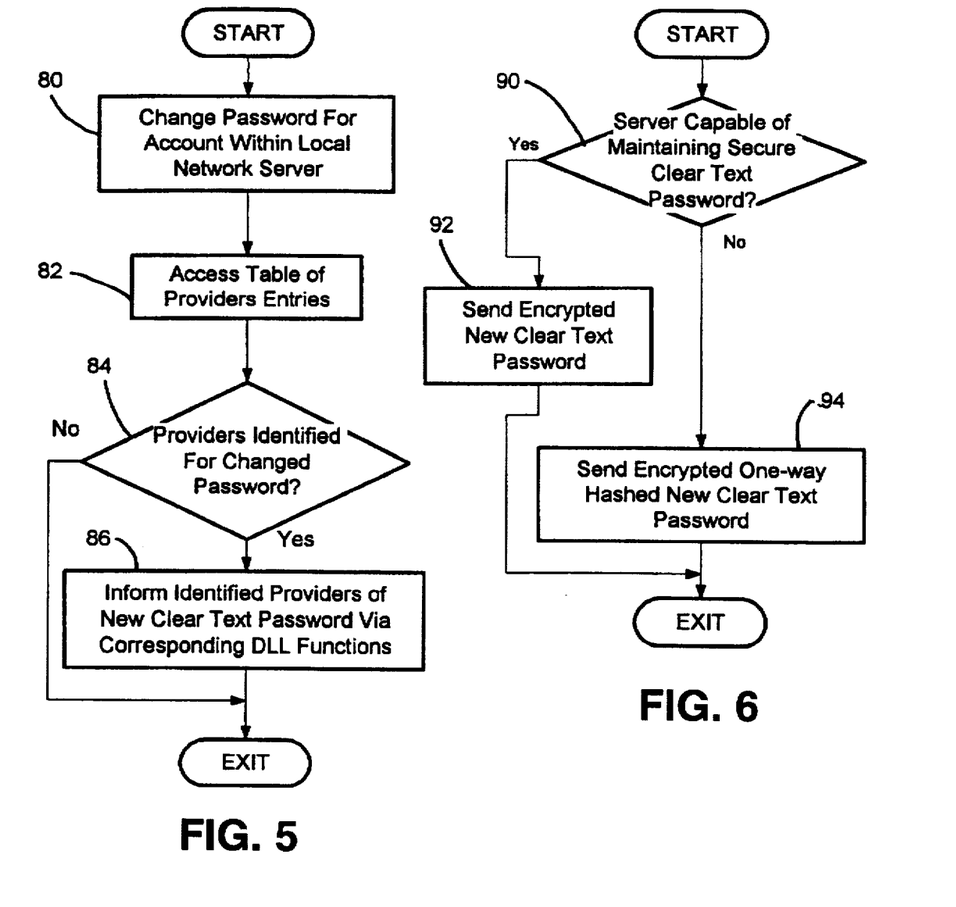
FIG. 5 is a flowchart summarizing the steps for synchronizing passwords changes between a first network server and other independent providers having a same password for a particular user.
FIG. 6 is a flowchart summarizing an enhancement to the described embodiments wherein an initial determination is made whether the first network server is capable of executing the new clear text password change protocol, and two alternatives are provided based upon the server's capabilities.

In regard to the internetwork password synchronization aspect of an embodiment of the present invention, reference is made to FIG. 5 which summarizes in enhanced detail step 72 in FIGS. 2 and 3. After the first server 12 determines that a valid, authenticated new password has been provided, at step 80 the first network server 12 replaces the old password "Pass_1" (or hashed form thereof) corresponding to the User_X's account, with the new password "Secret_1" (or hashed form thereof) in the table of accounts 34.

Next, at step 82, the first network server 12 accesses the table of providers 36. As previously explained, the table of providers 36 includes all of the providers participating in account password synchronization and their associated subroutines for carrying out password synchronization between the server 12 and the identified providers. Assuming that the Second Network Server 18, the File Server 14, and the Print Server 16 are all providers for which independent logon is required and for which synchronization is supported, the first network server 12 identifies subroutines, in the form of DLL's, which carry out password synchronization for these providers.

Next at step 84, if no providers are identified in the table of providers 34 during step 82, then control passes to the Exit of the password synchronization subroutine. However, if providers are identified (as was the case for the User_X account), then control passes to step 86 wherein the first network server 12 consults the table of providers 36 and calls subroutines (within the dynamically linked libraries) corresponding to providers identified during step 82. During step 86 the first network server 12 notifies each provider identified during step 82 of User_X's password change via the provider's corresponding DLL subroutines resident on the network node occupied by the first network server 12. After carrying out the routines for notifying the identified providers, control then passes to the EXIT of the password synchronization subroutine.

An interesting feature of this approach to synchronizing passwords, facilitated by the availability of a clear text password at the first network server 12, is that the first network server 12 permits the DLL subroutines corresponding to providers (identified during step 82) to communicate a changed account password to a respective provider according to a provider determined protocol. The first network server 12 passes the new clear text password (along with the account name or other account identification) to the DLL subroutines corresponding to the providers identified during step 82. The DLL subroutines perform provider specific one-way hash and/or encryption operations upon the clear text password before transferring the password change information to the associated provider. The DLL subroutines reside on the same physical node as the server. Therefore, it is not possible for the clear text password to be intercepted by a network line tap when a new clear text password is communicated to the DLL subroutines.

There is a security risk associated with providing a password change message to a remote computer in a manner such that the clear text form of the password may be extracted from the message and thereafter stored in the remote computer. For example, the password information stored on the remote computer may not be secure and a person may merely walk into the room containing the remote computer and access the table of accounts 34. In accordance with the preferred embodiment of the present invention, a mechanism is supplied for the first network server 12 to disable the clear text password transmit protocol when adequate password security does not exist at the first network server 12.

Therefore, turning now to FIG. 6, before a client such as client A 20 sends a change password message for a user, such as User_X, during step 90 it queries the first network server 12 whether the clear text password change protocol is available for use. If at step 90 the server replies that the clear text password change protocol is available, then at step 92 the client A 20 sends a change password message according to one of the clear text password change methods summarized in FIGS. 2, 3, and 5 (or in the case of an administrator setting a password, FIG. 7).

If at step 90, the first network server 12 returns a message indicating that the clear text password change protocol has been disabled, then control passes to step 94 wherein an alternative password message is created and sent to the first network server 12 containing an encrypted one-way hashed form of the new password for the User_X account.

Finally, while the above discussion has focused primarily upon a user changing a password for an account, it will be appreciated by those skilled in the art that the above described password change protocol can be modified slightly and used by an administrator to perform a special "password change" where an old password (or one-way hashed old password) is not available. Occasions where such a need arises include when a password is initially assigned to an account, or when a user forgets the password for the user's account. Such a change password facility is especially valuable to a network administrator faced with the task of setting up accounts for new users in a network wherein users must log onto many different providers. Those skilled in the art will appreciate the fact that the set of routines used by administrators to set the passwords is independent and distinct from the user password change routines.

With respect to the previously described clear text password change operations, the primary essential change to the previously described password change procedures is that the administrator must furnish alternative authentication information to the first network server 12 in view of the non-availability of an old password for the account. However, since an administrator is, in fact, authenticated when the administrator logs on to the first network server for purposes of administering the network accounts, there is no need for submission of separate authentication information. Thus, in a preferred embodiment of the present invention, the one-way hash of the administrator's password $H(P_{adm})$ replaces the hashed old password for an account in the previously described password change protocols. It is noted however, that an alternative value, intended to be known only by authorized users, can be used in alternative embodiments.

Figure 7:
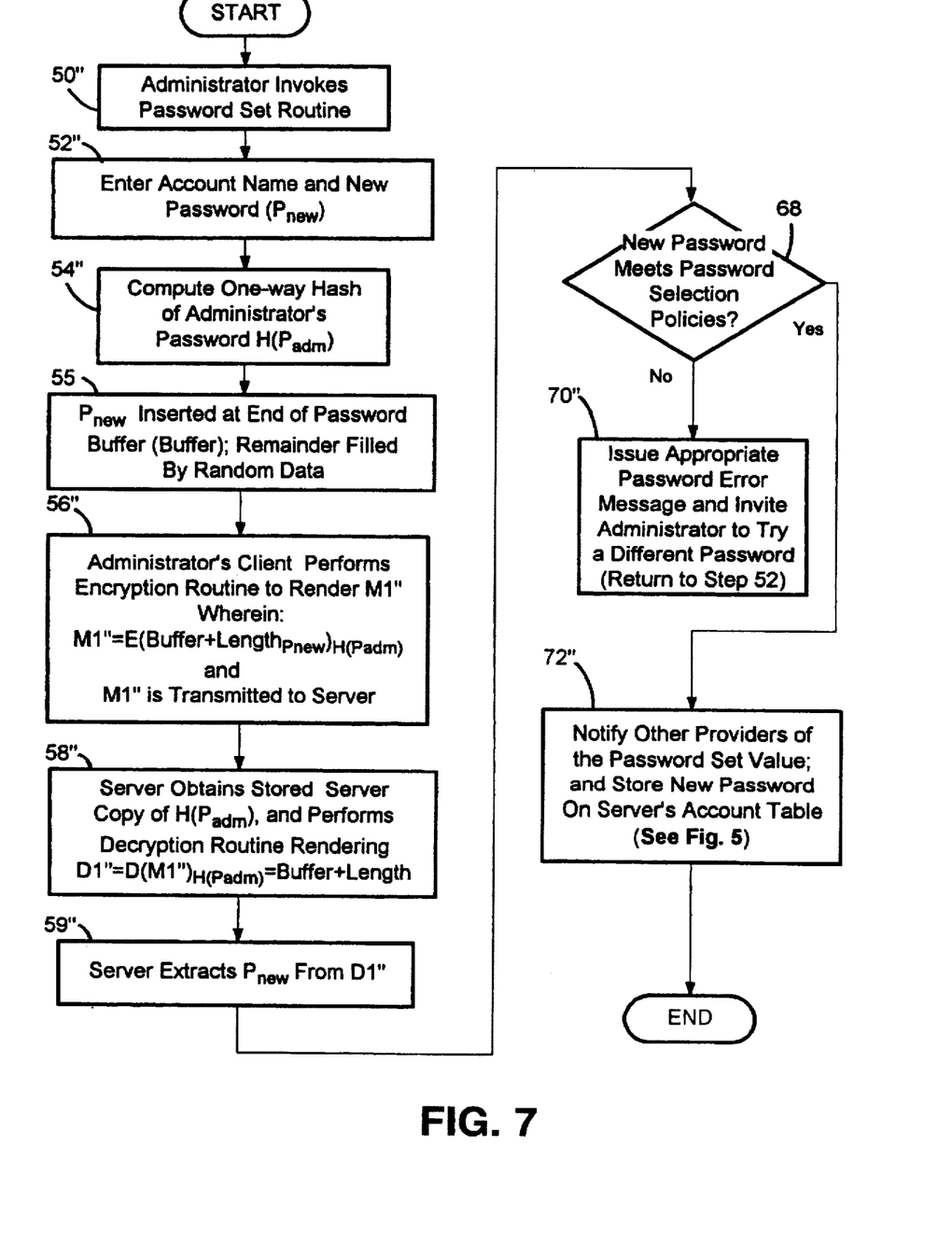
FIG. 7 is a flowchart summarizing the principal steps for setting a password for an account by an administrator in accordance with the present invention and wherein a new clear text password is placed within a message containing random filler data.

Turning briefly to FIG. 7, the steps are summarized for an administrator setting a password for an account. The double primed notation after step numbers is intended to show that the steps are similar, yet not identical to their counterpart steps in FIGS. 2 and 3. At step 50", the administrator invokes a password set operation at a client computer communicatively coupled to the first network server 12.

At step 52" the administrator enters an account name and a new password ($P_{new}$) for the account. In contrast to the previously described step 52, the administrator need not submit an authentication message (e.g. old password) since the administrator has previously submitted a password ($P_{adm}$), a one-way hashed form of which is used instead of a one-way hashed old password in subsequent steps in FIG. 7.

At step 54" a one-way hash function is applied to the administrator's previously supplied password. In contrast to the earlier described procedures, the password set routine does not require the authenticating message (M2).

Therefore, there is no need to apply a one-way hash function to the new clear text account password. Step 55 is unchanged from the previously described step 55 in FIG. 3.

Next, at step 56", Mi" is created by encrypting the buffer and length field created during step 55 using the hash of the administrator's password as the encryption key. For the reason explained above, the second message (M2 and M2' in FIGS. 2 and 3 respectively) is not needed because of previous authentication of the administrator. M1" is then transmitted to the server.

During step 58", the first network server 12 decrypts the first message M1" using the one way hash of the administrator's password, previously provided to the first network server 12, as a decryption key. This operation results in a decrypted first message (D1") containing the new clear text password. Next, during step 59" the server extracts the new clear text password from the decrypted first message (D1").

Since a second encrypted message is not used in the this embodiment of the present invention, steps corresponding to steps 60, 62, 64, and 66 are not included in the password set operation summarized in FIG. 7. Instead, control passes from step 59" to step 68. Because steps 68, 70" and 72" are essentially the same as the previously described corresponding steps in FIGS. 2, 3, and 5, their description will not be repeated here.

The embodiments of the present invention discussed above were chosen and described to provide the best illustration of the principles of the invention and its practical application to thereby enable one of ordinary skill in the art to utilize the invention in accordance with the inventors' preferred embodiment as well as various other embodiments and with various modifications as are suited to particular other contemplated uses of the invention. Such modifications and variations are within the scope of the invention as determined by the appended claims when interpreted in accordance with the breadth to which they are fairly, legally, and equitably entitled.

There is no intent to limit the invention to the embodiments. On the contrary, the intent is to cover all alternatives, modifications and equivalents included within the spirit and scope of the invention as defined by the appended claims.

What is claimed is:

1. A method for registering a new password for an account with a server via a client coupled to the server in a network, the server maintaining an accounts database including account identifications and corresponding passwords, the method comprising the steps of:

computing, by the client, a first message by encrypting a first data sequence including at least a new clear text password using an authenticating value as an encryption key, a form of the authenticating value being previously stored at the server for verifying the authenticity of a source of the new clear text password;

computing, by the client, a second message by encrypting a second data sequence including at least the authenticating value using a one-way hash of the new clear text password as an encryption key;

transmitting the first message to the server;

transmitting the second message to the server;

computing, by the server, the new clear text password from the first message, including at least the sub-step of decrypting the first message using the authenticating value, a form of which is maintained by the server, as a decryption key;

computing, by the server, the authenticating value from the second message, including at least the sub-step of decrypting the second message using a one-way hash of the new clear text password obtained from the first message as a decryption key;

verifying, by the server, the new password, the verifying step including at least the sub-step of determining that the authenticating value from the second message is the same as a server provided authenticating value that is based upon the form of the authenticating value previously stored at the server; and conditionally registering a form of the new clear text password in the accounts database based upon the results of the verifying step.

2. The method of claim 1 wherein the authenticating value is a form of an old clear text password for the account.

3. The method of claim 2 wherein the authenticating value is a one-way hash of the old clear text password for the account.

4. The method of claim 1 wherein the authenticating value is based upon a password submitted by a network administrator, thereby providing access to a password set function for setting the account password.

5. The method of claim 1 wherein the first data sequence comprises a password buffer including, in addition to the new clear text password, a set of random filler data, and a length field enabling a receiver of the first message to identify a portion of the password buffer occupied by the new clear text password.

6. The method of claim 5 wherein the random filler data occupies a lead portion of the password buffer.

7. The method of claim 5 wherein the computing the new clear text password from the first message further comprises the sub-step of extracting the new clear text password from the first data sequence obtained from the sub-step of decrypting the first message.

8. The method of claim 1 wherein the verifying step further comprises applying, by the server, at least one password selection protocol in order to ensure that the new clear text password for the account does not correspond to any prohibited password.

9. The method of claim 1 further comprising the step of registering the new password for the account with at least an additional independent provider, the account using a same password to logon to both the server and the additional provider, the registering step comprising the sub-steps of:

identifying the additional independent provider; calling a subroutine associated with the additional provider, and passing the new clear text password and an account identification as operands; and communicating the new password to the independent provider via the subroutine.

10. In a network system having at least one client and at least one server disposed for bi-directional communication, the server having a resource and the client having password-protected access to the resource, a method for changing an old password to a new password for an account comprising the steps of:

establishing a communication link between the client and the server;

computing a first value by encrypting a first message containing the new password with a one-way hash of the old password as an encryption key;

computing a second value by encrypting a second message containing a one-way hash of the old password with a one-way hash of the new password as an encryption key;

transmitting the first value and the second value from the client to the server;

retrieving at the server a copy of the one-way hash of the old password;

computing a third value by decrypting the first value with the copy of the one-way hash of the old password;

computing a fourth value by decrypting the second value with a one-way hash of the third value; and verifying that the copy of the one-way hash of the old password is the same as the computed fourth value.

11. The method according to claim 10, wherein the new password contained within the first message is in clear text form.

12. The method according to claim 10, further including the step of encrypting the new password before encrypting the entire first message.

13. The method according to claim 10, further including the step of including random data adjacent the new password within the first message.

14. The method according to claim 13, wherein the first message includes a portion indicative of the character length of the new password.

15. In a network system having a plurality of nodes including at least one client node, a server node and at least one provider node, the nodes being interconnected for bi-directional communication, the server and provider nodes each having a resource, and a first account having password-protected access to the resources of the server and provider nodes, a method for synchronizing a changed account password of the first account at the server node with a provider node comprising the steps of:

identifying a provider node at which the first account has password-protected access;

transmitting an identification for the first account and a new value for the changed account password in clear text form to a function residing on the server node; and transmitting to the provider node, via the function, a message for updating a password entry, on the provider node corresponding to the first account, to correspond to the new value for the changed account password.

16. In a network system having at least one client and at least one server disposed for bi-directional communication, the server maintaining an accounts database including account identifications and corresponding passwords, a method for changing an old account password to a new account password comprising the steps of:

receiving an encryption of the new account password with a one-way hash of the old account password as an encryption key;

receiving an encryption of a one-way hash of the old account password with a one-way hash of the new account password as an encryption key;

decrypting the received, encrypted new account password;

decrypting the received, encrypted one-way hash of the old account password;

verifying the validity of the new account password;

determining that the decrypted, encrypted one-way hash of the old account password is the same as a one-way hash of a previously stored old account password, and in response, replacing a value corresponding to the old account password by a new value corresponding to the new account password in the accounts database.

17. A method for transmitting a new password within an encrypted message to an accounts server via a client coupled to the accounts server such that the network accounts server may retrieve a clear text password from the encrypted message, the accounts server maintaining an accounts database including account identifications and corresponding passwords, the method comprising the steps of:

computing, by the client, a first message by encrypting a first data sequence including at least a new clear text password using an authenticating value as an encryption key, a form of the authenticating value being previously stored at the accounts server for verifying the authenticity of the source of the new clear text password;

computing, by the client, a second message by encrypting a second data sequence including at least the authenticating value using a one-way hash of the new clear text password as an encryption key;

transmitting the first message to the accounts server; and transmitting the second message to the accounts server.

18. A method for obtaining by an accounts server, a new password for an account from an encrypted password message containing a new clear text password, the server maintaining an accounts database including account identifications and corresponding passwords, the method comprising the steps of:

receiving a first message, the first message having been computed by encrypting a first data sequence including at least the new clear text password using an authenticating value as an encryption key, a form of the authenticating value having been previously stored at the accounts server for verifying the authenticity of a source of the new clear text password;

receiving a second message, the second message having been computed by encrypting a second data sequence including at least the authenticating value using a one-way hash of the new clear text password as an encryption key;

first computing the new clear text password from the first message, the first computing step including at least the sub-step of decrypting the first message using the authenticating value, a form of which is maintained by the accounts server, as a decryption key;

second computing the authenticating value from the second message, the second computing step including at least the sub-step of decrypting the second message using a one-way hash of the new clear text password, obtained from the first message during the first computing step, as a decryption key;

verifying the new password, the verifying step including at least the sub-step of determining that the authenticating value from the second message is the same as a server provided authenticating value that is based upon the form of the authenticating value previously stored at the server; and conditionally registering a form of the new clear text password in the accounts database based upon the results of the verifying step.

\* \* \* \* \*